Patented Jan. 11, 1944

2,338,973

UNITED STATES PATENT OFFICE 2,338,973

SYNTHESIS OF TOLUENE

Louis Schmerling, Chicago, Ill., assignor to Universal Oil Products Company, Chicago, Ill., a corporation of Delaware No Drawing. Application February 17, 1941, Serial No. 379,269

3 Claims. (Cl. 260—667)

This invention relates to a process for the production of toluene. This invention is related particularly to the manufacture of toluene from dibenzyl by a destructive hydrogenation in the presence of hydrogenating catalysts. As dibenzyl is readily prepared from benzene, the process of my invention comprises a method for making toluene utilizing the large quantities of benzene that are obtained in the coal tar industry or that may be prepared by the aromatization of $C_6$ fractions obtainable from petroleum.

Dibenzyl may be readily prepared by the interaction of benzene with symmetrical dichloroethane in the presence of Friedel-Crafts type catalysts. This invention does not propose to claim methods of making dibenzyl but is concerned with the destructive hydrogenation of the latter to form toluene, which in turn is a raw material for the manufacture of explosives. Typical hydrogenating catalysts that may be used in the process of my invention comprise zinc chloride, with or without supports, molybdenum oxide, alone or with supports, and the typical hydrogenating catalysts, such as those comprising nickel or nickel oxide, preferably composited with adsorbent material such as kieselguhr. The process of my invention may be operated either continuously or as a batch operation. In the continuous process a mixture of approximately one mol of dibenzyl to one to one-and-a-half mols of hydrogen may be passed at a temperature of the order of 400° C. over a granular catalyst of the type hereinbefore referred to, using preferably superatmospheric pressures. In batch operations, the dibenzyl charging stock may be mixed with the catalyst which may be in the form of a powder or small granules and the mixture supplied to an autoclave or pressure chamber, preferably equipped with means for agitation. Hydrogen gas is then supplied to the mixture at a superatmospheric pressure.

The following example illustrates the results obtainable when employing the batch method of operation. 50 grams of dibenzyl and 10 grams of a catalyst consisting of 25% anhydrous zinc chloride and 75% alumina made by wetting the alumina with a sufficient quantity of the concentrated zinc chloride such that the dried material contains the above composition, was added to a pressure bomb. The bomb was filled with hydrogen at room temperature at a pressure equal to 100 kg. per square cm. The mixture was heated for 4 hours at a temperature of 400° C., the maximum pressure during the run equalling 190 kg. per square cm., while the pressure at the end of the experiment was 85 kg. per square cm. The reaction product was found to contain 54 mols of toluene and 29 mols of ethylbenzene for every 100 mols of dibenzyl charged; 26 mols of unreacted dibenzyl were recovered. The ethylbenzene may, of course, be dehydrogenated to form the valuable product styrene.

I claim as my invention:

1. A process for producing toluene comprising subjecting dibenzyl to destructive hydrogenation in the presence of a catalyst comprising zinc chloride.

2. A process for producing toluene comprising subjecting dibenzyl to destructive hydrogenation in the presence of a catalyst comprising zinc chloride composited on an inert support.

3. A process for producing toluene comprising subjecting dibenzyl to destructive hydrogenation in the presence of a catalyst comprising zinc chloride supported on alumina.

LOUIS SCHMERLING.